United States Patent [19]

Moriconi et al.

[11] Patent Number: 5,530,208
[45] Date of Patent: Jun. 25, 1996

[54] PEN COMPUTER PEN GRIPPING MECHANISM

[75] Inventors: David Moriconi, Ben Lomond; Steve Seto, Milpitas, both of Calif.

[73] Assignee: Samsung Electronics Co., Ltd., Suwon, Rep. of Korea

[21] Appl. No.: 963,822

[22] Filed: Oct. 20, 1992

[51] Int. Cl.⁶ .................................................. G08C 21/00
[52] U.S. Cl. ................................................ 178/18; 345/179
[58] Field of Search ................................. 206/371, 564; 15/435; D19/81, 52, 55; 178/18–20; 211/69.1, 69.5, 88, 89; 345/379

[56] References Cited

U.S. PATENT DOCUMENTS

D. 327,498  6/1992  Watson et al. ...................... D19/52
D. 345,147  3/1994  Fukutake et al. .................. D14/100
4,132,311  1/1979  Glinert ............................. 206/564
4,948,172  8/1990  Chang .............................. 281/45
5,200,913  4/1993  Hawkins et al. ................... 345/179

*Primary Examiner*—Stephen Chin
*Assistant Examiner*—Kevin Kim
*Attorney, Agent, or Firm*—Skjerven, Morrill, MacPherson, Franklin & Friel; Paul J. Winters

[57] ABSTRACT

A pen computer includes a recession in the top surface adapted to releaseably retain a pen device. The pen is visible from the top, yet securely retained for storage and transport. The recession is proximate and parallel to one edge of the computer and includes an access notch exteding rom the edge of the computer to the recession which is sized so that a user can grasp and remove the pen device from the recession by placing a finger in the access notch. Retention is by provided by two resilient retention devices near either end of the recession.

2 Claims, 3 Drawing Sheets

PEN COMPUTER PEN GRIPPING MECHANISM

BACKGROUND OF THE INVENTION

1. Field

The present invention relates to the field of retention mechanisms for pen devices in pen computers.

2. Art Background

Portable pen computers characteristically include a large active screen area that is responsive to a pen or stylus device. Often, this pen or stylus device is especially adapted to cooperate with electronics within the screen so as to determine the position of the pen relative to the screen. This allows the user to effectively "write" data into the computer. Accordingly, it is important that the pen device be readily available to the user, as the pen computer may be inoperative without the corresponding specialized pen device. U.S. Pat. No. 4,927,986 issued to John J. Daly describes a pen computer having a tethered pen which is stored in a channel or groove located in the side of the computer. However, the pen is not readily visible from the top of the computer and the cord tether is undesirably cumbersome. Accordingly, a user cannot immediately determine whether the pen is present, and a novice may not be able to locate the pen at all.

Accordingly, it is desirable to provide a pen retention mechanism that makes the pen readily visible to the user while stored, securely retained during storage and transport, and readily accessible. Further, it is preferable that there be no cumbersome tether or cord.

SUMMARY OF THE INVENTION

A pen computer in accordance with the preferred embodiment of the present invention includes a recess in the top surface adapted to resiliently retain a pen device. The pen is visible from the top, yet securely retained for storage and transport. The recession is proximate and parallel to one edge of the computer and includes an access notch which extends from the edge of the computer to the recession. The access notch is located near the center of the recession and is sized so that a user can grasp the pen and remove it from the resession by placing a finger in the access notch. Retention is provided by two resilient retention devices located near either end of the recession, which engage the pen above the centerline of the pen.

This provides for retention of the pen in a secure position with little if any of the pen device protruding from the surface of the computer. The pen is readily visible and available, yet secure for storage and transport. Further, no cumbersome tether or cord is required. These and other advantages and features of the invention will become readily apparent to those skilled in the art after reading the following detailed description of the preferred embodiment of the present invention and studying the accompanying drawings.

DETAILED DESCRIPTION OF THE PREFERRED EMBODIMENT

Figure 1:
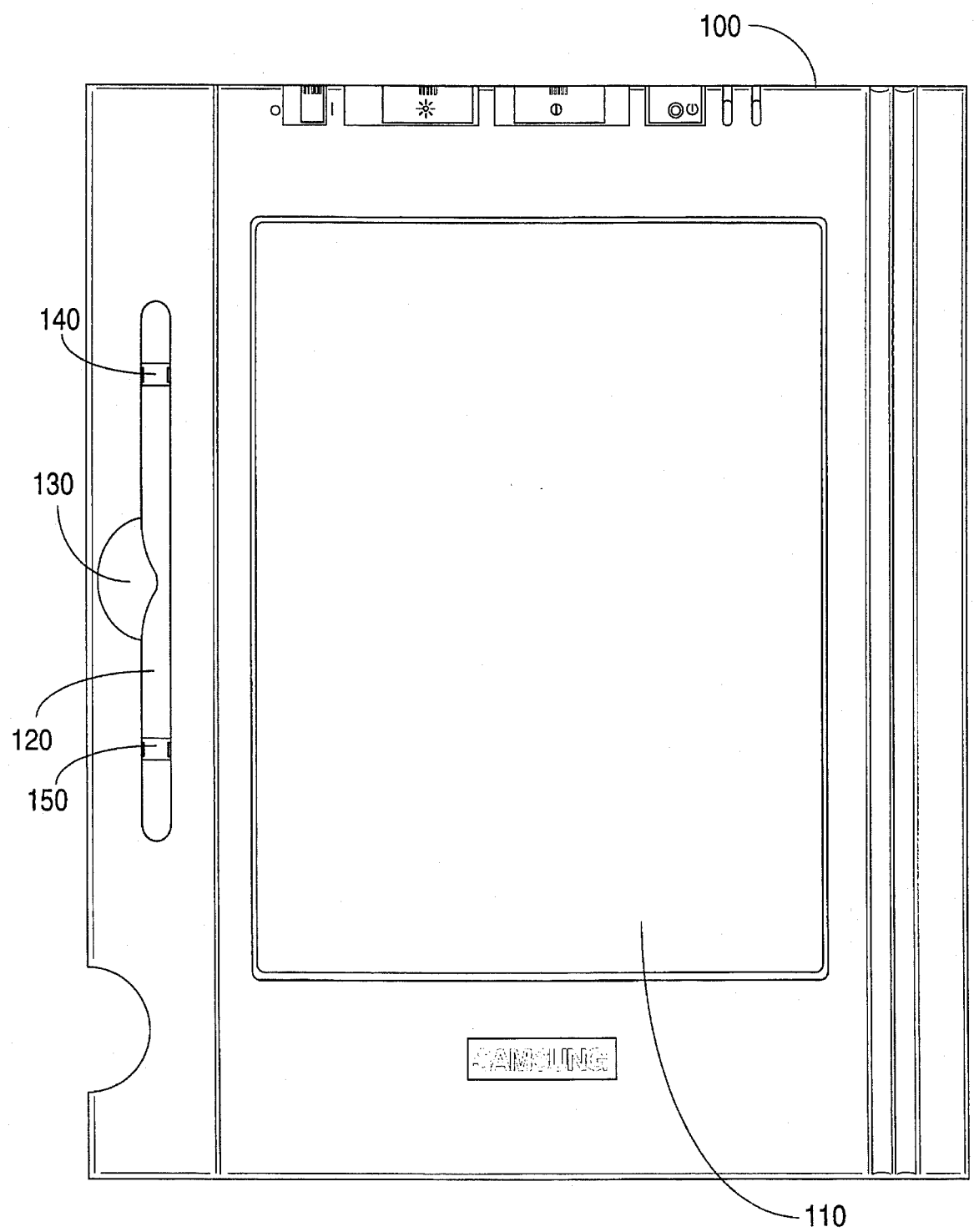
FIG. 1 is a perspective drawing of a pen computer which incorporates the preferred embodiment of the pen gripping mechanism.

The preferred embodiment of the present invention is a pen gripping mechanism for a pen computer as illustrated in FIG. 1. As illustrated, a pen computer 100 includes a display screen 110 and a receptacle 120 for holding a pen-type device. Receptacle 120 is parallel and proximate to the edge of pen computer 100, and includes an access notch 130 extending from the side of pen computer 100 sized to allow a user to grasp and remove a pen from the recession by placing a finger in access notch 130. Two retention devices 140 and 150 located near the ends of receptacle 120 resiliently retain a pen pressed into receptacle 120.

Figure 2:
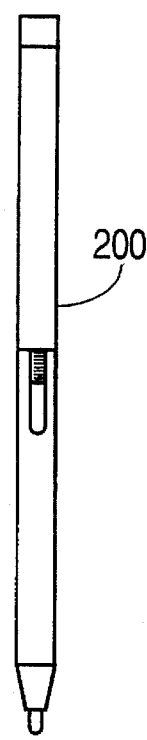
FIG. 2 is a perspective drawing of a pen for use with the pen computer of FIG. 1.

FIG. 2 is a perspective drawing of a pen 200 for use with pen computer 100. Pen 200 is slightly shorter and narrower than receptacle 120 so that it fits easily into receptacle 120 without protruding significantly above the top surface of pen computer 100. This ensures that pen 200 is not inadvertently knocked loose from receptacle 120.

Figure 3:
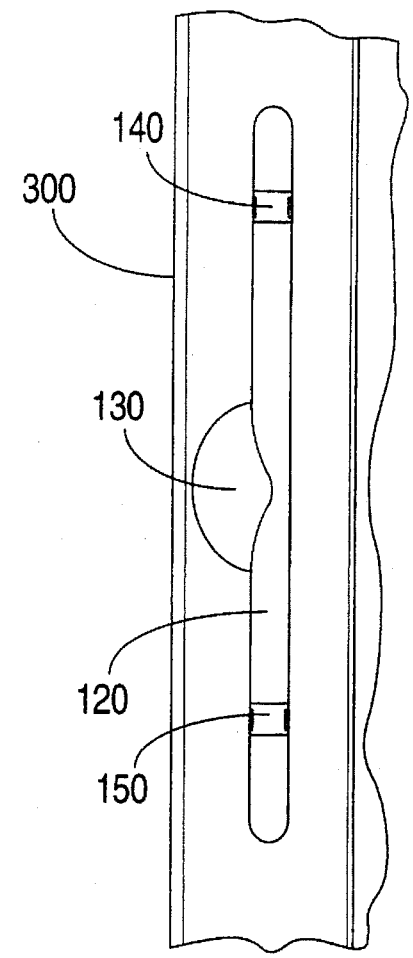
FIG. 3 is a near-actual size top view illustration of the top housing of pen computer 100 showing the portion of the top surface including receptacle 120.

FIG. 3 is a near-actual size top view illustration of the top housing of pen computer 100 showing the portion of the top surface including receptacle 120. As illustrated, receptacle 120 is parallel and proximate to the rounded edge 300 of pen computer 100, and includes an access notch 130 which extends from the side of pen computer 100 to recession 120. Access notch 130 is of the same depth as receptacle 120 and is sized to allow a user to easily grasp pen 200 from receptacle 120 by placing a finger in the cutout. Two snap-in retention devices 140 and 150 located near the ends of receptacle 120 resiliently retain pen 200 when pressed into receptacle 120.

Figures 4, 5:
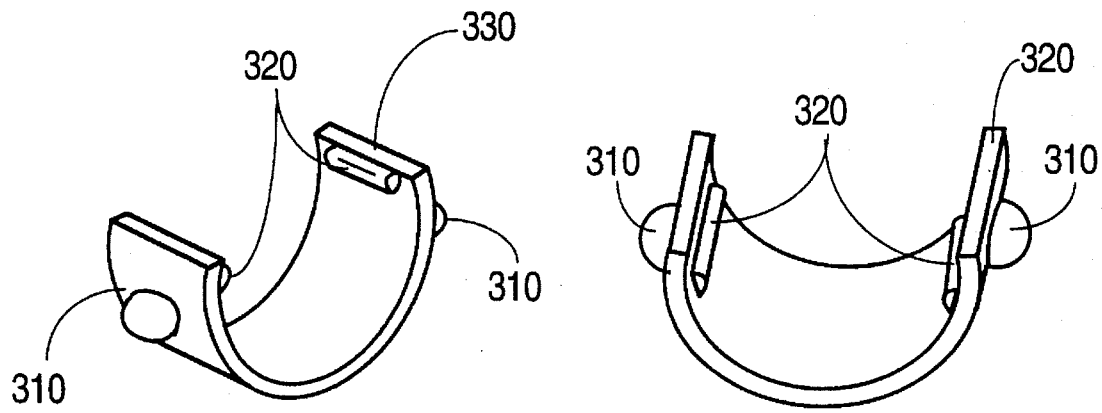
FIGS. 4 and 5 are two various perspective views of snap-in retention devices.

FIGS. 4 and 5 are various perspective views of resilient snap-in retention devices 140 (or the identical 150). Each snap-in retention device 140 (or 150) includes two hemispherical bumps 310 on the outside of the device and near the opposite ends for engagement with the housing of pen computer 100. Each snap-in retention device also includes two half-cylindrical bumps 320 on the inside of the device and above the centerline of receptacle 120. These bumps are resilient and shaped to firmly yet releaseably engage pen 200.

Figure 6:
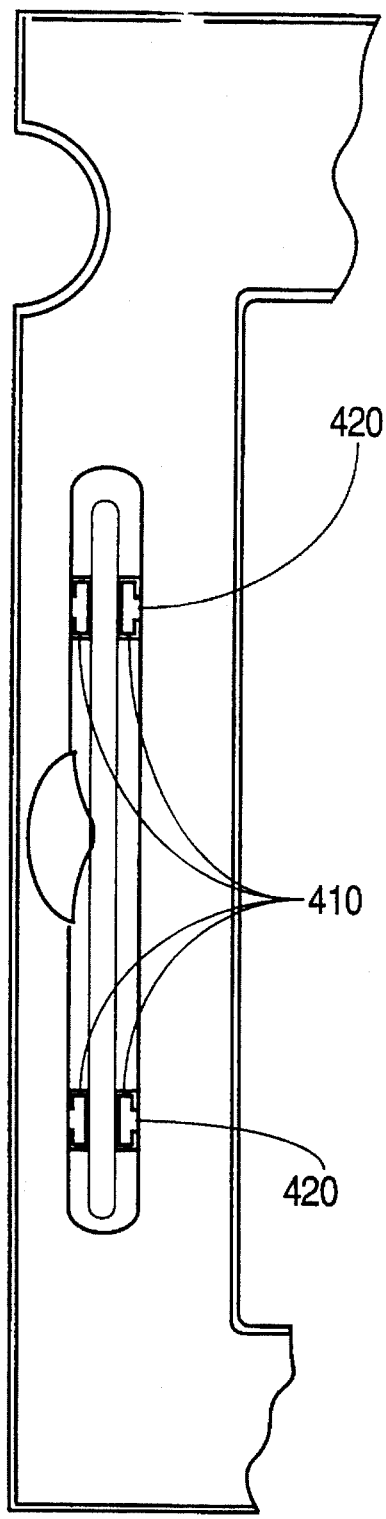
FIG. 6 is a view of the inside (back) of the top housing of the pen computer illustrating the sides of the receptacle, which protrudes into the interior of the pen computer.

FIG. 6 is a view of the inside (back) of the top housing of pen computer 100 illustrating the sides of receptacle 120, which protrudes into the interior of pen computer 100. Four alignment structures 410 are molded into the top housing of pen computer 100 and are aligned with two cutouts on the inside of receptacle 120 and include slots 420 adapted to receive hemispherical bumps 310 to align and help secure snap-in retention devices 140 and 150.

Figure 7:
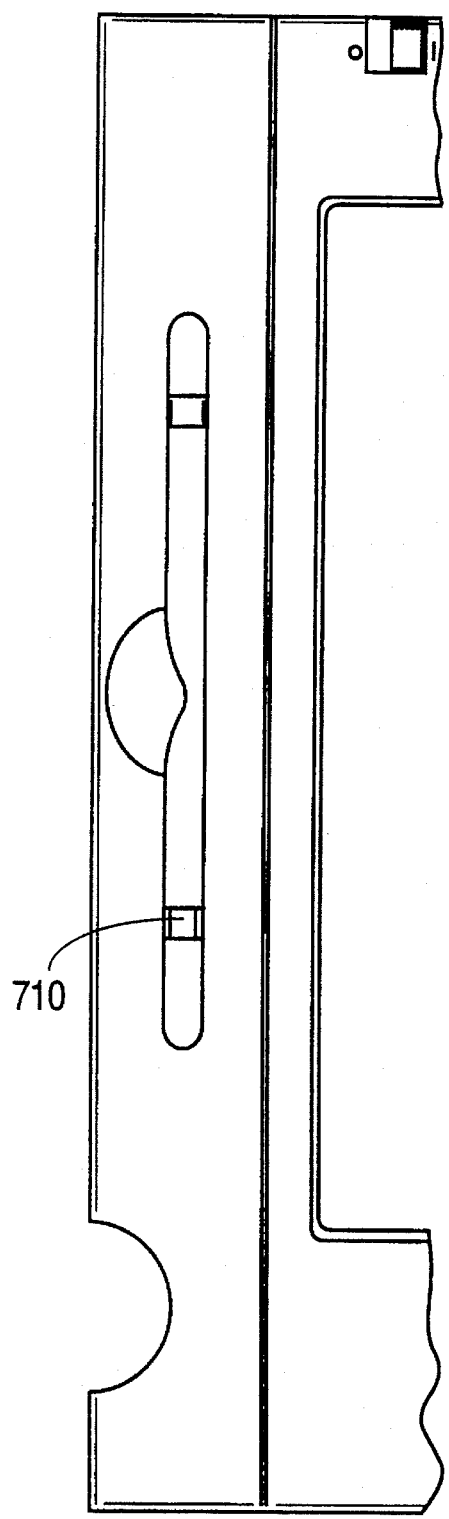
FIG. 7 is another near-actual size top view illustration of the top housing of the pen computer showing the portion of the top surface including the receptacle wherein one of the snap-in retention devices has been removed to better illustrated the cutout.

FIG. 7 is another near-actual size top view illustration of the top housing of pen computer 100 showing the portion of the top surface including receptacle 120 wherein one of the snap-in retention devices has been removed to better illustrate a cutout 710. Cutout 710 has the same depth and general shape as a snap-in retention device and is positioned slightly below the top edge of pen computer 100. Snap-in retention device 140 is resilient. Thus, when pressed into cutout 710, snap-in retention devices 140 springs back to take the shape of cutout 710, snaps into place, and aligns with the edges of cutout 71 0 and slot 420. The top edges of snap-in retention devices 140 engage opposite facing surfaces in the top housing formed by cutout 71 0 and are firmly secured. (They can be removed by pressing the retention devices inward from the back through slots 420.)

Resilient snap-in retention devices 140 and 150 must snap into position and also releaseably engage pen device 200. We have found that thermoplastic rubber is a suitable material for snap-in retention devices 140 and 150. The thermoplastic rubber compresses temporarily as pen device 200 is pressed into receptacle 120, then resiliently decompresses so as to releaseably retain pen device 200.

While the invention has been particularly taught and described with reference to the preferred embodiment, those versed in the art will appreciate that minor modifications in form and details may be made without departing from the spirit and scope of the invention. For example, the description of the preferred embodiment describes a untethered pen device, but a tethered pen device could be accommodated by adapting the recession to appropriately accommodate the tether. Accordingly, all such modifications are embodied within the scope of this patent as properly come within my contribution to the art and are particularly pointed out by the following claims.

We claim:

1. A pen computer for use with a pen device, the pen computer having a receptacle in the top surface having a generally half-circular cross section and adapted to receive the pen device in a location visible from the top, the receptacle proximate and parallel to one edge of the computer and including an access notch extending from the near edge of the computer to the receptacle sized so that a user can grasp and remove the pen device from the receptacle by placing a finger in the access notch, the receptacle further including two cutouts, disposed towards opposite ends of the receptacle, and two pairs of vertical slots, two of the slots centered on each cutout, one slot on either side of the receptacle, and further including two resilient snap-in retention devices generally in the shape of sections of half-cylinders, the retention devices having the same depth and general shape as the cutouts such that the top edges of the retention devices snap-in and engage corresponding downward facing surfaces of the cutouts, the retention devices each further including two hemispherical bumps centered on their outer surface near opposite ends for engagement with the slots in the receptacle, the retention devices each further including two horizontal half-cylindrical bumps on the inside surface positioned to be above the centerline of the receptacle when the retention device is inserted into the cutout, such that a pen may be firmly yet releaseably engaged by the half-cylindrical bumps when the retention devices are inserted into the cutouts.

2. A pen computer as in claim 1 wherein the receptacle cutouts are positioned slightly below the top edge of the receptacle, such that when a retention device is pressed into a cutout, the top edges of the retention device engage opposite downward facing surfaces of the slot and the two hemispherical bumps on the outside of the retention device align with the slots so as to align the retention device with the receptacle.

* * * * *